Figure 1:
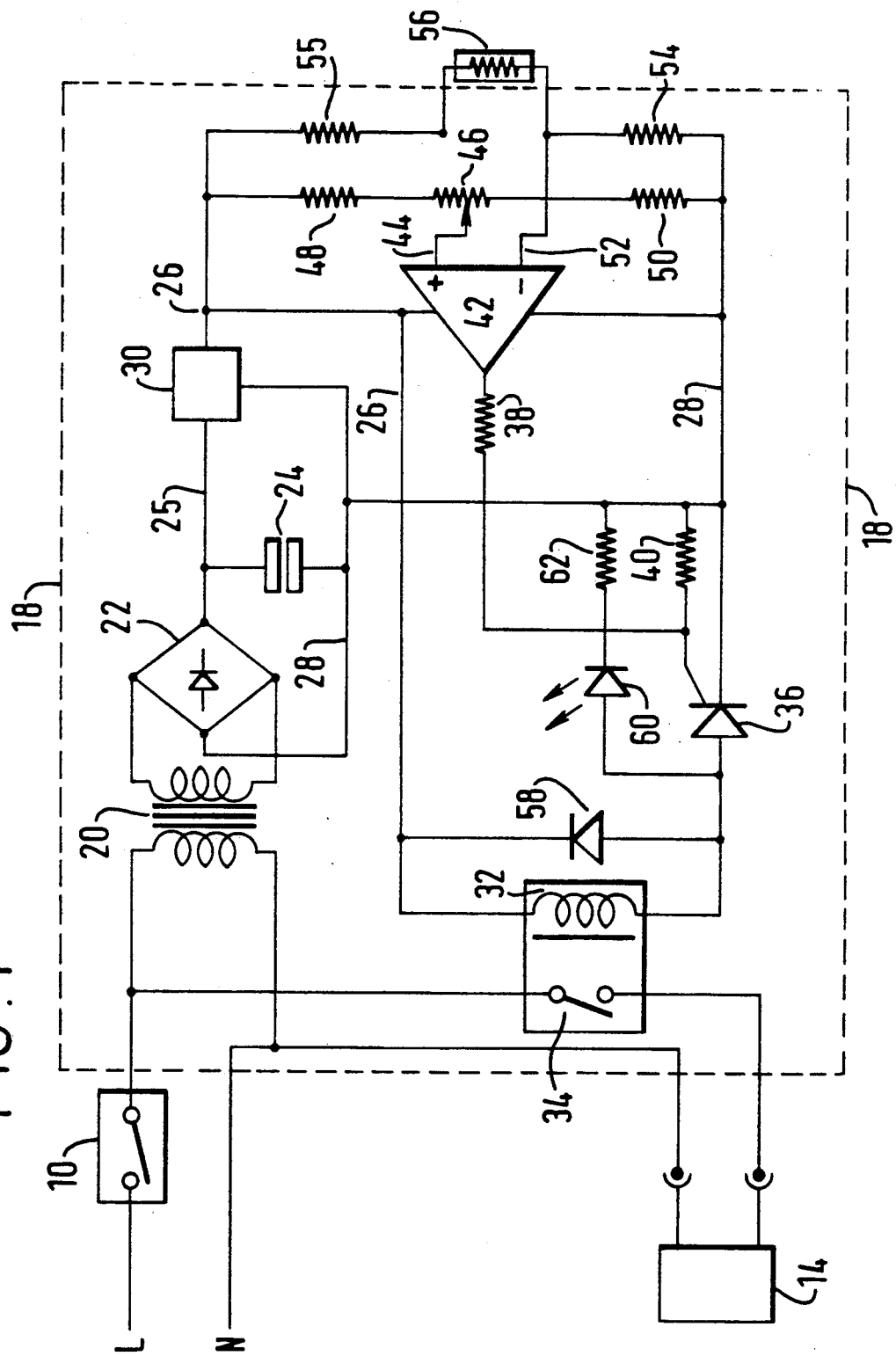

United States Patent [19]

Noye

[11] Patent Number: 5,072,879
[45] Date of Patent: Dec. 17, 1991

[54] HEATING SYSTEM CONTROL

[76] Inventor: Michael E. Noye, 118 Hill House Road, Stone, Dartford, Kent, England, DA2 6EX

[21] Appl. No.: 348,960

[22] Filed: May 8, 1989

[30] Foreign Application Priority Data

May 11, 1988 [GB] United Kingdom ............... 8871186

[51] Int. Cl.$^5$ ............................................. F24D 3/00
[52] U.S. Cl. ................................... 237/8 R; 236/91 F
[58] Field of Search ............... 237/8 R, 8 C, 2 A; 236/91 F, 20 R; 165/11.1

[56] References Cited

U.S. PATENT DOCUMENTS

| 2,345,277 | 3/1944 | McGrath | 237/8 R X |
| 2,602,591 | 7/1952 | Wilson et al. | 236/91 F |
| 4,535,931 | 8/1985 | Bartok et al. | 236/20 R |

*Primary Examiner*—Henry A. Bennet
*Attorney, Agent, or Firm*—Bauer & Schaffer

[57] ABSTRACT

A method and apparatus for controlling operation of a heating system (particularly a central heating system) including a boiler directly heating and passing water to a pipe network proide for sensing the temperature of the pipe network at a position therein remote from the boiler and controlling operation of the boiler in accordance with that sensed temperature. The apparatus includes switch means (operational amplifiers or comparators)—responsive to a voltage output by a device including a transducer sensing the temperature of the pipe network and—operable to allow the boiler to fire until the sensed temperature reaches a first level and then prevent the boiler firing until the sensed temperature falls below a second level less than the first. The two temperature levels may be varied, and the second level may be varied in dependence upon an ambient temperature remote from an area being heated. An SCR is provided controlling operation of a relay in the power supply to a fuel control valve for the boiler—the SCR being controlled in response to the difference between the voltage output of the temperature sensor and a reference voltage. Operation of the relay may be further controlled by a transistor itself controlled in response to the difference between the voltage output of the temperature sensor and a reference voltage. The apparatus may include an LED illuminated when the boiler is disabled so as to provide an indication thereof. Temperature sensing may be effected by a thermistor or a transducer which passes a current proportional to the temperature thereof and which is connected in series with resistor.

16 Claims, 4 Drawing Sheets

HEATING SYSTEM CONTROL

DESCRIPTION

The invention relates to methods and apparatus for controlling heating systems in particular the boilers of hot water central heating systems.

Conventional hot water central heating systems usually comprise a gas or oil fired boiler arranged to pass heated water to a network of pipes to which room heating radiators and at least one heat exchanger (in a cylinder for providing hot water for domestic purposes) are attached. In such systems heat imparted to the water in the boiler is given up in the radiators and heat exchanger to heat the rooms and/or water in the cylinder and the water is returned to the boiler for re-heating via the pipe network.

The heat output of a radiator is primarily a function of the temperature of the air in the room in which it is located, the temperature of the water fed to it, and the rate at which the heated water is passed to the radiator.

In addition to the heat output from the radiators in a central heating system there are also heat losses from the pipe network itself.

The operation of the boiler and in particular the temperature to which water is heated therein is usually controlled by a thermostatic controller included in the boiler to monitor the temperature of water at the boiler and operable to control the supply of fuel to the boiler. Usually this controller may be adjusted by a user to provide that the temperature to which water is heated in the boiler can be varied over a range of desired values. Ultimately the thermostatic controller included in the boiler is operable to prevent it overheating.

One known method of controlling the heat output of radiators in a central heating system provides that the flow of heated water around the network of pipes (particularly if the heated water flow is pumped) is controlled by a further central thermostatic device monitoring the temperature of the air in the area being heated and operable to cut off the heated water flow when a desired pre-set temperature has been reached. In an effort to balance the system and provide desired thermal outputs from the radiators, such an arrangement may also provide that the radiators are each provided with a mechanical valve adjustable to limit the volume of water flowing thereinto from the pipe network.

Such arrangements have proved to be difficult to operate effectively—in particular to ensure that a desired thermal output is achieved from each radiator in the system and are of use only if the heated water flow is pumped and not for example of the type relying upon gravity/convection effects. To overcome these difficulties it has been proposed that the central thermostatic air temperature monitoring device be removed and that each of the radiators in the system be provided with a valve responsive to the temperature of the air adjacent the radiator to control the flow of heated water thereto from pipe network.

This proposal is effective in permitting the accurate control of the desired thermal output from each radiator in the system—when the area being heated by a particular radiator reaches the desired temperature the radiator is effectively disconnected from the system. It does have the disadvantage, however, of meaning that the temperature of water in the pipe network (as distinct from the radiators they serve) is wholly under the control of the thermostatic controller included in the boiler.

The basic design of boiler thermostatic controllers has remained unchanged for the last fifty years and is usually of the type offering high limit temperature control that is to say it is operative to stop fuel flow to the boiler when the pre-set temperature has been reached and to restart the fuel flow when the temperature of the water in the pipe network has fallen by a pre-set amount (usually approximately 3° C.) This small temperature difference is provided to stop the thermostatic control valve in the boiler constantly operating to turn the boiler off and on in response to small (fraction of a degree Celcius) changes in the temperature of the water in the pipe network.

The rate at which radiators in a given central heating system can dissipate heat depends upon the rate of heat loss from the area being heated and even the fabric of the radiators and their surroundings—and with modern boilers it is often the case, as the room temperature increases, that the boiler can generate heat faster than the system can dissipate that heat. Therefore despite the safeguard given by the 3° C. difference between the temperatures at which the thermostatic control valve in the boiler operates to stop and start fuel flow to the boiler, the monitored temperature of the water in the pipe network may fall (due to heat losses from those pipes) to a level at which the boiler will re-fire before the radiators in the system are capable of dissipating more heat. This condition is known as cycling and is characterised by the boiler firing simply to satisfy the requirement of the thermostatic control valve included in it—that is to say the boiler is generating heat which will not be usefully given up by the radiators in the central heating system.

This problem is both financially and ecologically disadvantageous—the boiler is using more fuel than is necessary to provide the level of heating required leading to increased running costs, an increased rate of depletion of the available fuels and increasing the general level of atmospheric pollution by the unnecessarily produced flue gases.

It is an object of this invention to provide a method and an apparatus for controlling heating systems e.g. central heating systems which alleviates and/or overcomes this problem.

In one aspect the invention provides a method of controlling operation of a heating system including a boiler arranged to directly heat and pass water to a pipe network of the system, comprising sensing the temperature of the pipe network at one or more positions therein remote from the boiler and controlling operation of the boiler in accordance with that sensed temperature.

The method may be for controlling operation of a central heating system, and provide that the boiler is energised to heat water passed to the pipe network until the sensed temperature reaches a first temperature and is thereafter de-energised until the sensed temperature falls below a second temperature less than the first temperature.

The boiler may operate under the control of a thermostatic controller therein, and the method provide that said first and second temperatures are less than the temperatures at which the thermostatic controller in the boiler acts to de-energise and re-energise operation of the boiler respectively.

In a second aspect the invention provides apparatus for controlling operation of a heating system including a boiler directly heating and passing water to a pipe network of the system and comprising means for sensing the temperature of water in said pipe network at one or more positions remote from the boiler and means for controlling operation of the boiler in accordance with the output of the temperature sensing means.

The apparatus may be for controlling operation of a central heating system, and include switch means responsive to the output of said temperature sensing means, which switch means are operable to permit energisation of the boiler to heat water passed to the pipe network until the output of the temperature sensing means indicates that a temperature being monitored has reached a first temperature level and thereafter prevent energisation of the boiler until the output of said temperature sensing means indicates that the said temperature or another temperature being monitored has fallen below a second temperature level less than the first temperature level.

The said temperature sensing means may be arranged to generate a first first voltage output whenever said monitored temperature reaches or exceeds said first temperature level and a second voltage output whilst the first said monitored temperature or another monitored temperature is less than said second temperature level.

Means may be provided enabling said first and said second voltage outputs to be varied.

Desirably said first and second voltage outputs are variable in equal amounts in dependence upon the ambient temperature of an area remote from the area being heated by the central heating system.

The switch means may with advantage include semiconductor switch means controlling operation of a further switch which when closed connects a fuel control valve for the boiler to a power supply therefore and which when open disconnects said power supply and said fuel control valve.

A light emitting diode may be provided in the semiconductor switch means and be illuminated when that switch means is operable to disable operation of the boiler so as to provide an indication thereof.

The further switch preferably comprises a normally open relay having a coil which is connected in the circuit of said semiconductor switch means and which when energised to close is operable to connect said fuel control valve to said power supply therefore.

In one embodiment the semiconductor switch means desirably includes a silicon controlled rectifier operation of which is controlled by a first control device in response to said first and second voltage outputs of said temperature sensing means and a reference voltage, said silicon controlled rectifier being switched non-conductive and causing said further switch to open when said first temperature level is indicated by the temperature sensing means and thereafter be latched conductive and cause the further switch to close when the said second temperature level is indicated by the temperature sensing means.

In another embodiment the said semiconductor switch means comprises a bistable latching circuit which is switched to a first state opening said further switch by a first control device operating in response to said first output voltage from said temperature sensing means and which is switched to a second state closing said further switch by a second control device operating in response to said second output voltage of said temperature sensing means.

The bistable latching circuit may comprises a silicon controlled rectifier and a transistor the emitter-collector path of which transistor is connected in series both with the silicon controlled rectifier and the coil of said relay, the silicon controlled rectifier and transistor both being biased conductive in response to said second output voltage of said temperature sensing means and said transistor being biased non-conductive in response to said first output voltage of said temperature sensing means.

The temperature sensing means comprises one or more thermistor devices, or one or more temperature transducers operable to pass a current proportional to the temperature thereof and connected in series with resistor.

The temperature sensing means may include a second temperature transducer operable to pass a current which is proportional to the temperature thereof, and which is connectable in parallel with said first mentioned temperature transducer and is mountable such that the current passed thereby is proportional to ambient temperature outside a building heated by the central heating system.

The first or said first and second control devices may be implemented as operational amplifiers or comparators.

If the boiler operates under the control of a thermostatic controller therein, the apparatus preferably further includes means for setting said first and second voltage outputs at levels equivalent to sensed temperatures less than the temperatures at which the thermostatic controller in the boiler acts to de-energise and re-energise, respectively, the boiler.

The temperature sensing means may comprise a single temperature sensor mounted to sense the temperature of water in the pipe network at a position remote from the boiler, and to provide said first output voltage when the sensed temperature thereat reaches or exceeds a first predetermined temperature and to provide said second output voltage when the sensed temperature thereat reaches or falls below a second predetermined temperature.

Alternatively, the temperature sensing means may include a first temperature sensor mounted to sense the temperature of water in the pipe network at a first position remote from the boiler and to provide said first output voltage when the sensed temperature at said first position reaches or exceeds a first predetermined temperature, and a second temperature sensor mounted to sense the temperature of water in the pipe network at a second position remote from the boiler and said first position and to provide said second output voltage whilst the sensed temperature at said second position is less than or equal to a second predetermined temperature. In this arrangement the first temperature sensor is desirably mounted to sense the temperature of water in the pipe network flowing from the boiler whilst the second temperature sensor is mounted to sense the temperature of water in the pipe network flowing to the boiler.

If the apparatus is for controlling operation of a central heating system supplying heated water to both room heating radiators and a heat exchanger in a hot water cylinder included in the system, the apparatus preferably includes switch means operable selectively to connect either said second integrated circuit temperature transducer or a reference resistance in parallel with the said first integrated circuit temperature transducer when the system is called upon to provide room heating alone or to heat the water in said cylinder.

Again, if the apparatus is for controlling operation of a central heating system supplying heated water to both room heating radiators and a heat exchanger in a hot water cylinder included in the system, it preferably provides temperature sensing means operable to sense the temperature of the pipe network at positions remote from the boiler indicative of the temperature of water being fed to respectively first the said radiators and second the said heat exchanger, and including further switch means operable selectively to enable control of the boiler in response to the outputs of either said first or said second temperature sensing means when the system is called upon to provide room heating alone or to heat the water in said cylinder.

Figure 2:
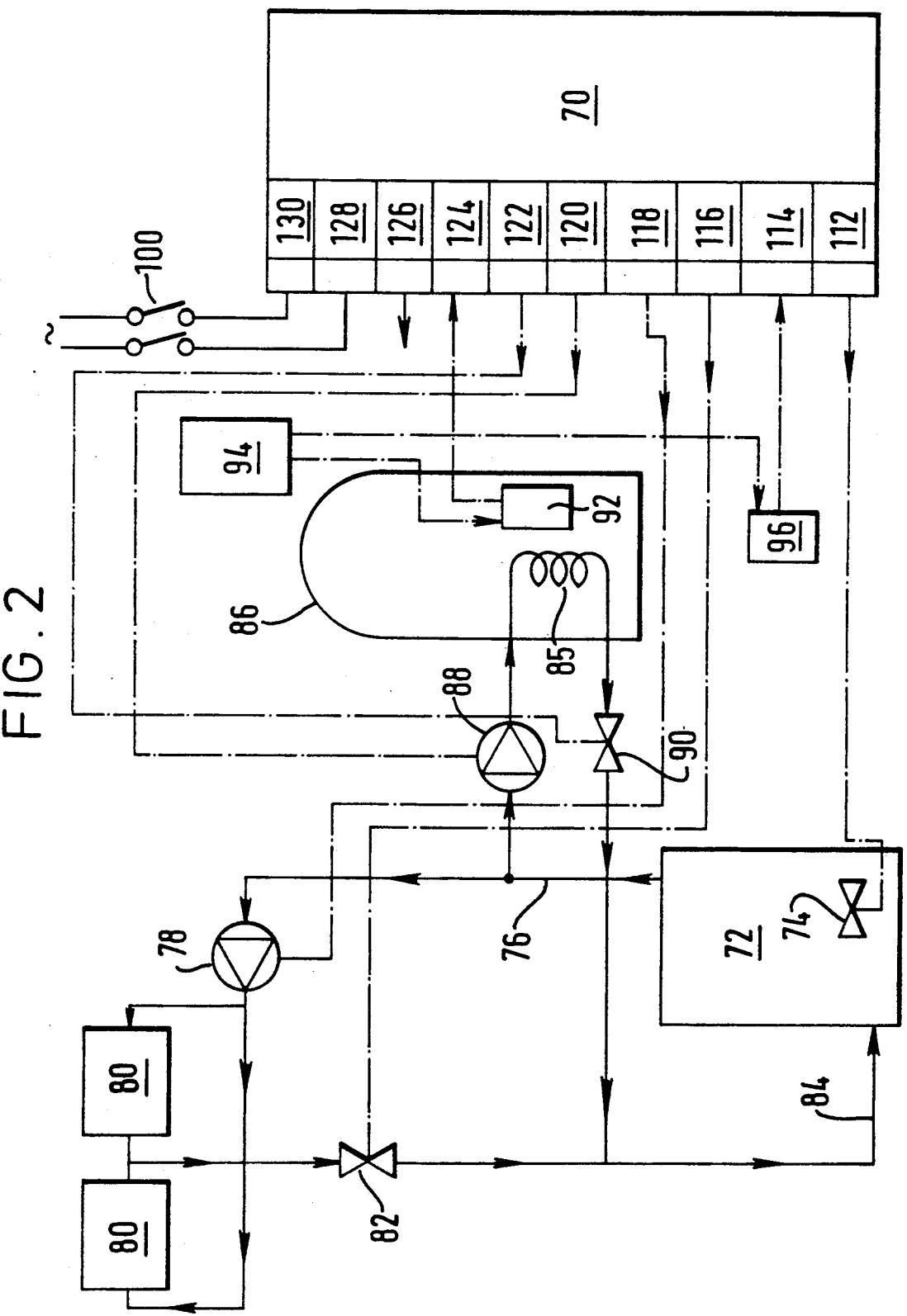
Figure 3:
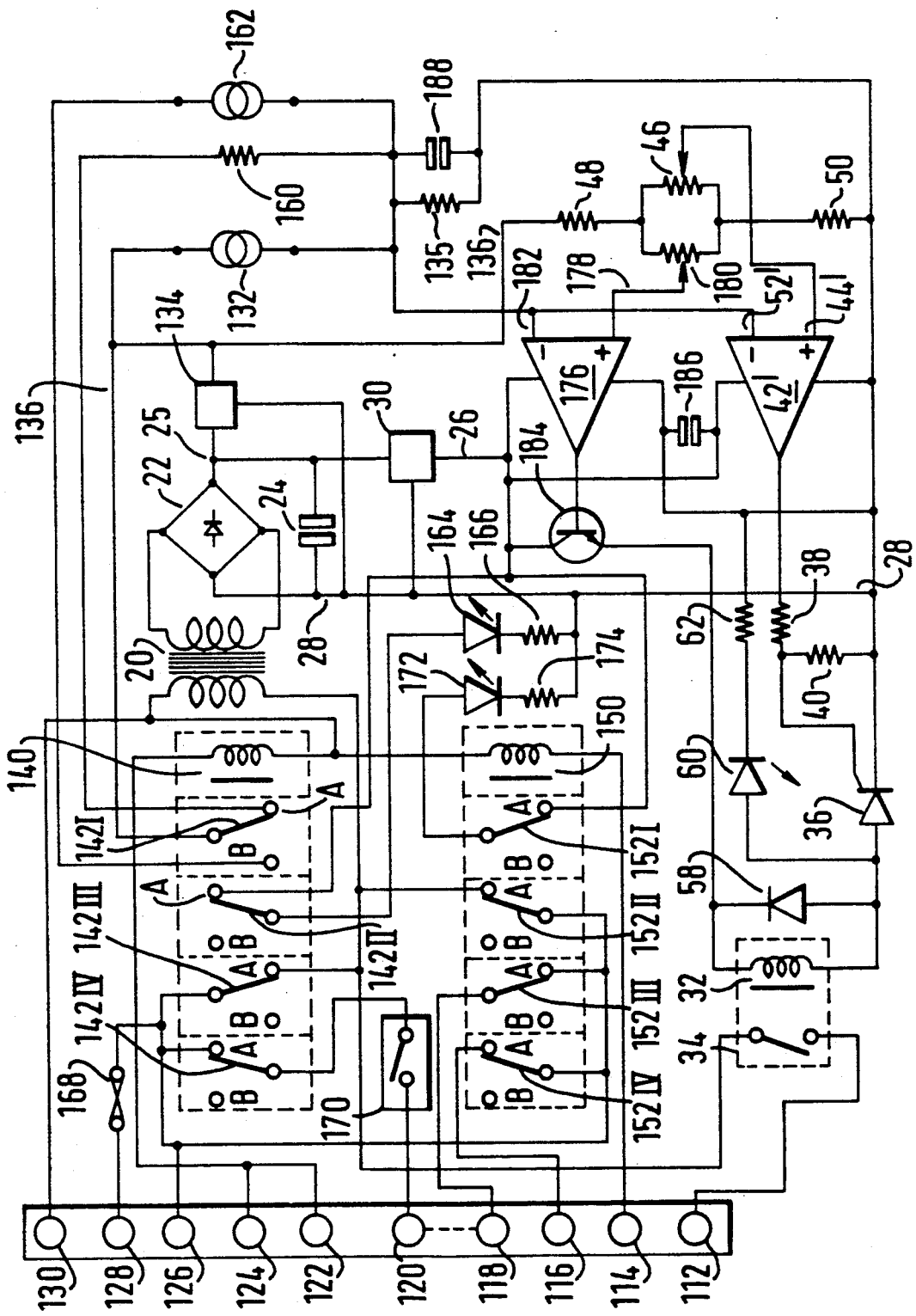
Figure 3A:
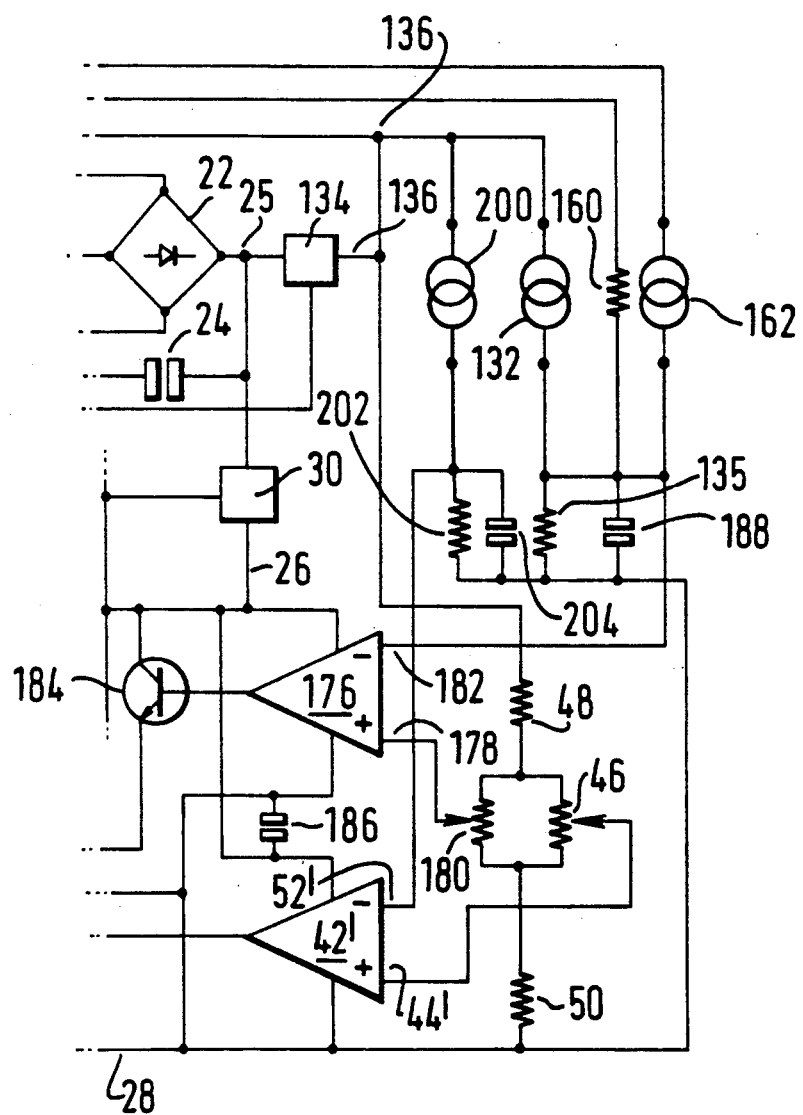

The above and other aspects, features and advantages of the invention will become apparent from the following description of two central heating system controllers embodying the invention made with reference to the accompanying drawing in which:

FIG. 1 is a circuit diagram of a first central heating system controller embodying the invention, FIG. 2 diagramatically illustrates the connection of a second system controller embodying the invention in a central heating system, and FIG. 3 is a circuit diagram of the system controller shown in FIG. 2 showing at FIG. 3A a modified part of the circuit of that system controller.

FIG. 1 of the drawings shows at 10 a thermostatic controller included in a conventional hot water central heating boiler 11. Thermostatic controller 10 is arranged to control the supply of power from a mains supply 12 to a fuel flow control valve 14 via lines 16 in response to the temperature of water being directly heated by boiler 11. Water heated in the boiler passes therefrom to a pipe network indicated generally at 13 incorporating to room heating radiators 13' and possibly a heat exchanger 13" in a cylinder (not shown) for providing hot water for domestic purposes.

Heat imparted to the water in the boiler is given up in the radiators (and heat exchanger) to heat the rooms (and water in the cylinder) and the water is returned to the boiler for re-heating via the pipe network.

The boiler may be gas or oil fired and control valve 14 is arranged to pass a supply of gas (or oil) to the boiler when the temperature of the water being heated and sensed by controller 10 is below a level pre-set in the controller and to cut-off that supply whenever the sensed water temperature reaches or exceeds that preset level.

The system controller of the present invention comprises those parts bounded by the chain dotted lines 18 connected across the lines 16.

The system controller comprises a step down transformer 20 the output of which is coupled to a bridge rectifier 22 providing—via a smoothing capacitor 24—a rectified DC voltage across two lines 25 and 28. This voltage is used to provide 12 VDC across two lines 26 and 28 via a voltage regulator 30 of known form. As can be seen a coil 32 of a relay 34 is connected in the anode—cathode circuit of a silicon controlled rectifier 36 across lines 26 and 28. Relay 34 is coupled in the lines feeding power to the fuel flow control valve 14.

The gate of silicon controlled rectifier 36 is coupled to the junction of resistors 38 and 40 connected between the output of an operational amplifier 42 and line 28. Operational amplifier 42 is coupled between the lines 26 and 28 to operate to amplify the difference in voltage applied to its two inputs.

The first input 44 of operational amplifier 42 is coupled to variable resistor 46 itself coupled to line 26 by resistor 48 and to line 28 by resistor 50. The second input to operational amplifier 42 is connected to the junction of a resistor 54 and a negative coefficient thermistor 56 coupled across lines 26 and 28 as shown.

A trimming resistor 55 is also provided, as shown and if required, in series with thermistor to enable adjustment of the circuit operating parameters. Coil 32 is shunted by a diode 58 and silicon controlled rectifier 36 by an LED 60 and current limiting resistor 62 as shown.

In use thermistor 56 is physically mounted on a pipe in pipe network 13 at a position remote from the boiler being controlled and its resistance is inversely proportional to the temperature of the water in that pipe.

It will be appreciated that in the configuration shown the output of amplifier 42 will be more or less positive in dependence upon the relative values of the voltages applied to its inputs 44 and 52. If the voltage on input 52 is greater than that on input 44 the output of the amplifier 42 will be less positive and vice versa.

Thus the output of operational amplifier 42 is dependent upon the resistance of the thermistor 56 and the setting of variable resistor 46 which may be adjusted when initially setting up the control apparatus.

Operation of the system controller will now be described. When the boiler is switched on from cold (e.g. under the control of a programmer—not shown) the boiler thermostatic controller 10 closes with the result power is applied to the step down transformer 20 so that 12 VDC is established across the lines 26 and 28. At this time the temperature of water monitored by thermistor 56 is low and the resistance of thermistor 56 is high. Thus the voltage on input 52 to amplifier 42 is less than that on its input 44 and the output of operational amplifier 42 is positive with the result that the voltage on the gate of silicon controlled rectifier 36 is positive and silicon controlled rectifier 36 is latched ON.

Silicon controlled rectifier 36 therefore conducts with the result that coil 32 carries a current sufficient to close relay 34 and supply power to the close the fuel flow control valve 14. As the current flow is through the silicon controlled rectifier the LED 60 does not light.

As the boiler fires the temperature monitored by thermistor 56 will rise causing its resistance to fall until such time the voltage on input 52 to amplifier 42 is greater than that on its input 44 and the output of amplifier 42 will be driven negative. At this time, however, the silicon controlled rectifier is latched ON and will continue to conduct.

The boiler continues firing until the temperature monitored by the boiler thermostatic controller 10 in the boiler reaches the pre-set temperature (or until operation is interrupted by an external thermostatic device or the programmer). At this time power to fuel flow control valve 14 and transformer 20 is interrupted with the result that relay 34 will relax and the fuel flow to the boiler will be cut off.

Diode 58 acts to protect the circuitry, in particular the semiconductor devices therein, against reverse voltages as the relay relaxes.

When the boiler is next called upon to fire by the boiler thermostatic controller 10 (e.g. when water temperature monitored by controller 10 falls below that at which the fuel flow control valve 14 would again be opened in the absense of the system controller now described) the temperature monitored by the thermistor 56 is greater than the temperature pre-set in the system controller by adjustment of the variable resistor 46 holding the output of amplifier 42 less positive and thereby holding silicon controlled rectifier 36 OFF.

At this time the LED takes a current and is illuminated, however, the current taken is limited by the resistor 62 and insufficient to cause coil 32 to close relay 34 and the fuel flow control valve 14 remains closed.

In time the temperature monitored by thermistor 56 will fall by an amount such that its resistance rises and the voltage on input 52 to amplifier 42 becomes less than that on input 44 of the amplifier with the result that the output of amplifier 42 will go more positive allowing the silicon controlled rectifier 36 to conduct and close relay 34 and thereby open the fuel flow control valve 14.

The particular temperature monitored by the thermistor which will enable the silicon controlled rectifier to fire may be adjusted—when the system controller is installed—by adjustment of the variable resistor 46. It is envisaged that once this temperature has been pre-set it will not thereafter be further altered.

It will be seen that various modifications may be made to the described arrangement so far described without departing from the scope of the present invention.

Other configurations of control circuitry may be utilised and other specific devices may be used in place of those described for example the thermistor 56 may be replaced by a positive temperature coefficient thermistor device if the inputs to the amplifier 42 are reversed.

The thermistor may be replaced by any device usable to monitor temperature and provide an output voltage in which varies in response to the monitored temperature.

The amplifier may be varied to provide an output the polarity of which varies between levels at which the silicon controlled rectifier fires and latches. The operational amplifier may be replaced with a comparator the output of which switches between LOW and HIGH levels.

The silicon controlled rectifier may be replaced with other switching devices which have the same operating function—that is to say devices which once switched ON will stay latched ON until the power thereto is discontinued, or, with slight modification to the circuitry described, any suitable bistable device which is positively switched between its two stable states. LED 60 may if desired be omitted.

The system controller described with reference to FIG. 1 requires that the electrical connection between the boiler thermostatic controller 10 and fuel control valve 14 be broken to permit the electrical coupling of the system controller to the boiler control circuitry.

This may be perceived as a disadvantage as its fitting will require the services of a skilled or semi skilled electrician. To overcome this disdavantage—and to provide a system controller which offers better and more complete control of a heating system (enabling for example the separate control of the hot water supply and central heating provided by a heating system—and to provide for compensation in respect of ambient weather conditions) the system controller illustrated in FIGS. 2 and 3 has been devised.

FIG. 2 shows the system controller 70 of the invention connected to a central heating system including a boiler 72 and having a boiler fuel control valve 74. Heated water flows from the boiler via a hot water flow pipe 76 to a pump 78 controlling the flow of heated water from the boiler 70 to one or more radiators 80 in the system and the return water flow to boiler 70 is via a motorised valve 82 to an inlet 84 of the boiler as shown. Heated water is also fed from flow pipe 76 to inlet 84 via a heat exchanger 85 in a hot water cylinder 86 under the control of a pump 88 and motorised valve 90 as shown to provide a source of heated water for washing and other domestic purposes. Cylinder 86 includes a hot water thermostat 92 for controlling the temperature to which water in the cylinder may be heated.

The central heating system further includes a timer/programmer 94 controlling operation of the water temperature thermostat 92 and a room temperature thermostat 96 both of which are in turn connected to the system controller 70. Finally system controller 70 is connected to a mains electrical supply 98 by a switch 100.

System controller 70 as illustrated has ten electrical terminals by means of which it is connected to the other elements of the central heating system, and connections (not shown) to the sensors of the system. These control connections are shown in chan dotted line.

Terminal 112 is connected to the boiler fuel flow control valve 74.

Terminal 114 is connected to receive the output of room thermostat 96 under the control of the timer/programmer 94.

Terminals 116 and 118 provide outputs controlling operation of motorised valve 82 and pump 78 respectively and terminals 120 and 122 provide outputs controlling operation of pump 88 and motorised valve 90 respectively.

Terminal 124 is connected to receive the output of water thermostat 92 whilst terminal 126 provides a line power output to active elements of the central heating system (e.g. timer/programmer 94).

Terminals 128 and 130 receive the line and neutral of the mains power input from switch 100.

It is to be noted that in this embodiment the system controller 70 is simply connected in the power supply line to the boiler fuel flow valve 74 and no connection to the boiler thermostatic controller need be made. Indeed this system controller provides both high and low level water temperature control and when fitted the boiler thermostatic controller is simply set to its highest available temperature setting to provide failsafe temperature control of the boiler.

Various elements within system controller 70 correspond to those already described with reference to the embodiment of FIG. 1 and are give the same reference numerals. These elements have the same form and function as those earlier described and will not now be further described.

Within system controller 70 shown in FIG. 3, operational amplifier 42 has been replaced by a comparator 42'. Control of the silicon controlled rectifier 36 is effected by the output of comparator 42' which switches between HIGH and LOW levels in dependence upon the relative levels of the voltages applied to its inputs 44' and 52'.

Again, the thermistor 56 has been replaced by an active integrated circuit temperature transducer 132 such as that marketed by ANALOG DEVICES of NORWOOD, Mass., USA under the brand name AD592. Such a device has the ability to pass a current which varies in dependence upon the absolute temperature to which it is subjected (typically 1 microampere per °K.). Temperature transducer 132 is physically mounted on flow pipe 76 from boiler 72 and passes a current proportional to the temperature of the water in that pipe.

IC temperature transducer 132 is powered via a reference voltage source device 134 of known form putting 10 volts DC on line 136. Transducer 132 is connected by resistor 135 to line 28. As the current passed by transducer 132 is proportional to its temperature the voltage at the junction of transducer 132 and resistor 135 is proportional to the temperature sensed by the transducer 132.

The neutral power line to terminal 130 of the controller is fed to the primary of step down transformer 20 and to the coils 140 and 150 of relays having arms 142I, 142II, 142III and 142IV, and 152I, 152II, 152III and 152IV respectively. Each relay arm 142 and 152 closes onto a contact A when its associated coil 140 and 150 is energised and relaxes onto a contact B when that coil 140 is de-energised.

The relays are connected as follows:

Contact 142IA is connected to a resistor 160 in parallel with transducer 132 and 142IB with a second similar, IC temperature transducer 162 similar to and connected in parallel with transducer 132 and resistor 160. Depending upon the energisation of coil 140 one or other of transducer 162 and resistor 160 is connected, via relay arm 142I, to the regulated power supply on line 136.

The contacts B for relay arms 142II, 142III and 142IV, and 152I, 152II, 152III and 152IV are each blind—that is to say unconnected to other parts of the circuitry.

Contact 142IIA is connected as shown to both contact 152IA of the second relay and the positive side 26 of the regulated power supply from voltage regulator 30 whilst the arm of this relay is connected via an LED 164 and current limiting resistor 166 to the power supply line 28 so that when 142II closes onto 142IIA LED 164 is connected across lines 26 and 28 and emits light.

Contact 142IIIA is tapped in parallel with contact 152IIA of the second relay to both the primary of the transformer 20 and to the switch in relay 34 passing power to the terminal 112 of the system controller whilst arm 142III is coupled to the line input terminal 128 of the system controller 70 via a fuse 168.

Contact 142IVA is coupled to the line input terminal 128 of the system controller 70 via the fuse 168 as is the contact 152IIIA of the second relay and as are the arms 152II and 152IV of that relay as shown Arm 142IV is coupled via a manually operable switch 170 to terminal 120 for controlling operation of the pump 88 in the system.

Arm 152I of relay 152 is connected via an LED 172 and current limiting resistor 174 to the power supply line 28 so that when 152I closes onto 152IA LED 172 is connected across the power supply lines 26 and 28 and emits light.

Arm 152III of the second relay is coupled to terminal 118 of system controller 70 to control operation of the pump 78 in the system and the contact 152IVA is coupled to terminal 116 of system controller 70 to control operation of the motorised valve 82 in the system.

The regulated power supply across lines 26 and 28 powers a comparator 176 one input of which is tapped from a voltage divider formed by the resistors 48 and 50 across lines 136 and 28 and a variable resistor 180 as shown. The other input 182 to comparator 176 is tapped to the junction of transducers 132 and 162 with resistor 135.

The output of comparator 176 drives the base of an NPN transistor 184 the emitter-collector path of which is coupled between the coil 32 in relay 34 and the positive regulated power supply line 26 as shown.

The circuit shown in FIG. 3 further includes capacitors 186 and 188 decoupling the active elements in the circuit from one another and preventing noise affecting operation of the system controller 70.

In use the IC temperature transducer 132 is mounted on the flow pipe 76 from boiler 72 at a position remote from the boiler and the transducer 162 is mounted (in a weather proof enclosure) on an outside wall of the building being heated by the system.

In operation power from the mains supply to terminal 128 of system controller 70 is fed—via the fuse 168—to the terminal 126 from which the active elements of the central heating system outside system controller are powered (e.g. to timer/programmer 94).

The input signals from these elements are taken to the noted terminals of system controller 70 and fed appropriately to either the relay 152—for control of the heat supplied to the radiators 80 in the central heating system, or to the relay 142—for control of the heat supplied to the cylinder 86.

The system may be operated in to provide room heating independently of hot water and vice versa. In either mode of operation power—as noted above—is taken from the mains supply via terminal 128 of system controller 70 and then fed via fuse 168 to terminal 126 from which the active elements of the central heating system outside the system controller are powered.

Considering first operation in room heating mode alone and assuming that the system is starting from cold the system is switched under control of timer/programmer 94 and room thermostat 96 delivers the full line AC Voltage to terminal 114. As a result power is applied to relay coil 150 and step down transformer 20 so that a regulated 12 VDC is established across the lines 26 and 28 (via regulator 30) and a reference voltage established across lines 136 and 28 (via reference voltage source 135).

Coil 150 is now energised and the arms of relay 152 will close onto the contacts A. However, coil 140 is un-energised and the four arms of relay 142 rest on the contacts B of that relay. In this mode of operation water thermostat 92 is disabled by the timer/programmer 94 with the result that there is no input to terminal 124 of system controller 70 with the results that there is no output on terminals 120 and 122 to the pump 88 or motorised valve 90 and coil 140 of relay 142 is not energised.

The closure of arm 152I onto contact 152IA will power LED 172 causing it to light and indicate that the system is running in room heating mode. Closure of 152IIA, 152IIIA and 152IVA will supply mains voltage from terminal 128 to one terminal of switch 34, terminal 118 (powering the pump 80) and terminal 116 (powering and opening the motorised valve 82).

The closure of contact 142IB connects IC temperature transducer 162 in parallel with IC temperature transducer 132.

IC temperature transducers 132 and 162 pass current and a voltage is established at their junction with resistor 135 which is passed to input 52' of comparator 42' and input 182 of comparator 176.

As the monitored temperature in flow pipe 76 is at this time relatively low the voltage at input 52' of comparator 42' and input 182 of comparator 176 (which is proportional sum of the currents passed by transducers 132 and 162) is also relatively low—lower than the voltage fed to input 44' of comparator 42' from the pre-set variable resistor 46, and the voltage fed to input 178 of comparator 176 from the pre-set variable 180.

Thus the outputs of comparators 42' and 176 go HIGH. The HIGH output of comparator 176 biases transistor 184 ON and at the same time the HIGH output of comparator 42' latches silicon controlled rectifier 36 ON. Thus coil 32 in relay 34 is connected (by silicon controlled rectifier 36 and the emitter-collector path of transistor 184) across the regulated power supply lines 26 and 28 and is energised.

As a result relay 34 closes connecting terminal 112 of system controller 70 to the mains power via relay contact 152IIA. The boiler 72 now fires. As the current flow is through the silicon controlled rectifier LED 60 does not light.

Whilst the boiler is operational the temperature in flow pipe 76 increases until it reaches a level at which the current passed by transducer 132 generates a voltage at input 52' of comparator 42' more than that pre-set by resistor 46 causing the output of comparator 42' to go LOW. However, silicon controlled rectifier 36 remains latched ON.

The temperature in flow pipe 76 increases further whilst the boiler fires until it reaches a level at which the current passed by transducer 132 generates a voltage at input 182 of comparator 176 more than that pre-set by resistor 180 causing the output of comparator 176 to go LOW turning transistor 184 OFF.

At this time silicon controlled rectifier 36 turns OFF.

The temperature in flow pipe 76 will begin to fall and in time reach a level at which the current passed by IC transducer 132 generates a voltage at input 182 of comparator 176 less than that pre-set by resistor 180 causing the output of comparator 176 to go HIGH again. At this time silicon controlled rectifier 36 is latched OFF however and relay 34 does not close.

This is equivalent to the time that the boiler would be called upon to re-fire in the absense of the system controller 70 and if it were under the control of a boiler thermostatic controller monitoring the return water temperature to the boiler However, as noted the temperature pre-set in the system controller by adjustment of the variable resistor 46 holds the output of amplifier 42 less positive and thereby holding silicon controlled rectifier 36 OFF.

At this time a current is taken by LED 60 (via the emitter-collector path of transistor 184 and coil 32) which is limited by resistor 62 and insufficient to cause coil 32 to close relay 34. No power is fed to terminal 112 and the boiler fuel flow control valve remains closed.

The temperature in flow pipe 76 will continue to fall until it reaches a level at which the current passed by transducer 132 generates a voltage at input 52' of comparator 42' less than that pre-set by resistor 46 causing the output of comparator 42' to go HIGH again—switching silicon controlled rectifier 36 ON. As the silicon controlled rectifier is now conducting low level current to LED 60 falls to a lower level than will sustain its operation and the LED will be extinguished.

The temperatures as monitored by transducer 132 at which the voltages applied to the inputs of comparators 42' and 176 will cause the silicon controlled rectifier 36 and transistor 184 to switch are set to be approximately 11° C. apart. As a result the boiler will prevented from firing until the temperature of the water in the boiler has dropped by a significantly larger amount than would be the case were operation of the boiler being controlled by a boiler controller of conventional form in which the equivalent temperature difference is usually no more than 3° C.

The function of second transducer 162 is to provide an additional level of control of the system having regard to the monitored outside ambient temperature.

When the system is operating in a mode to provide room heating alone the temperature monitored by the second transducer 162 causes it to conduct passing a current establishing a voltage at the inputs 52' and 182 of comparators 42 and 176 which is proportional to the outside temperature. As a result voltages generated by transducer 132 (which depend upon the temperature of the water in the system) at which the silicon controlled rectifier 36 and transistor 184 will switch are each reduced by an amount proportional to the outside temperature.

Thus the higher the outside temperature monitored by the second transducer 162 the lower the water temperatures monitored by transducer 132 at which the boiler will be de-energised and re-energised. Thus if the ambient temperature monitored by transducer 162 is relatively high the system will tend fire the boiler for significantly less time and so provide less heat to the room heating radiators 80 than if the monitored outside temperature were relatively low.

Diode 58 acts to protect the circuitry, in particular the semiconductor devices therein, against reverse voltages as the relay 34 relaxes.

The particular temperature monitored by the IC transducer 132 which will enable the silicon controlled rectifier 36 to fire may be adjusted—when the control system is installed—by adjustment of the variable resistor 46. It is envisaged that once this temperature has been pre-set it will not thereafter be further altered.

If the system is operated to provide hot water alone and again assuming the system is starting from cold the system is switched under control of timer/programmer 94 and water thermostat 92 delivers the full line AC votalge to terminal 124. Once again power is applied to the step down transformer 20 so that a regulated 12 VDC is established across the lines 26 and 28 (via regulator 30) and a reference voltage established across lines 136 and 28 (via reference voltage source 134).

As coil 140 is now energised the arms of relays 142 close onto the contacts A. At this time coil 150 is unenergised and the four arms of relay 152 rest on the contacts B of that relay. In this mode of operation room thermostat 96 is disabled by the timer/programmer 94 with the result that there is no input to terminal 114 of system controller 70 with the result that coil 150 is not energised.

Closure of arm 142I onto contact 142IA will connect resistor 160 in parallel with transducer 132. Resistor 160 is a current limiting resistor passing a current substantially the same as that passed by temperature transducer 162 when that device is at zero °C.—thus in this mode of operation the effective outside temperature compensation provided by transducer 162 is removed.

The closure of arm 142II onto contact 142IIA will power LED 164 causing it to light and indicate that the system is running in hot water mode, and the closure of contacts 142IIIA and 142IVA will supply the line voltage from terminal 128 to one terminal of switch 34, and (via switch 170) to terminal 120 (powering the pump 88).

As before temperature transducer 132 will pass current establishing a voltage at inputs 52' and 182 of comparators 42' and 176 turning controlled rectifier 36 and transistor 184 ON energising coil 32 with the result that relay 34 closes enabling boiler 72 to fire. Again, as current flow is through the silicon controlled rectifier LED 60 does not light.

Whilst the boiler is operational in this mode the temperature in boiler flow pipe 76 increases until it reaches a level at which the current passed by transducer 132 is so great that the output of comparator 42' goes LOW—leaving, however, controlled rectifier 36 latched ON. The further increase in temperature of flow pipe 76 from boiler 72 will in time cause the current passed by temperature transducer 132 to generate a voltage at input 182 of comparator 176 causing the output of comparator 176 to go LOW turning transistor 184 OFF. At this time controlled rectifier 36 is unlatched and turns OFF.

Once again, the temperature of water in the flow pipe 76 from the boiler will begin to fall and in time reach a level at which the current passed by transducer 132 generates a voltage causing the output of comparator 176 to go HIGH again, however, controlled rectifier 36 is OFF and relay 34 does not close.

Again this situation causes a low current to be taken by LED 60 which is sufficient for the LED to light but insufficient to cause coil 32 to close relay 34. No power is fed to terminal 112 and the boiler fuel flow control valve remains closed.

As the temperature in the flow pipe 76 continues to fall it reaches a level at which the current passed by transducer 132 causes the output of comparator 42' to go HIGH again—turning controlled rectifier 36 ON. Once again, as the silicon controlled rectifier is now conducting the low level current to LED 60 falls to an even lower insufficient to sustain its operation and the LED will be extinguished.

It will be seen that in this mode of operation the closure of relay contact 142IA which connects resistor 160 in parallel with temperature transducer 132 and removes transducer 162 from the circuit provides that control of water temperature is effected in response to the level of current passed by transducer 132 and resistor 160. As resistor 160 passes a current equivalent to that passed by transducer 162 when that transducer is at 0° C. water heating is achieved in the shortest possible time by the system controller.

It will be appreciated that when it is desired to provide both room heating and hot water system controller 70 receives inputs under the control of the timer/programmer 94 from both the room thermostat 96 (to terminal 114) and water thermostat 92 (to terminal 124).

In this situation operation of the system controller is as described above—power is applied to step down transformer 20 and a regulated 12 VDC is established across the lines 26 and 28 and a reference voltage established across lines 136 and 28.

The "A" contacts of relays 142 and 152 are closed and control effected in the manner described above with the the closure of relay contact 142IA connecting resistor 160 in parallel with transducer 132 to give priority to heating water in the cylinder of the system.

It will be appreciated that system controller 70 provides the option, should it be desired, of having room heating and cylinder water heating controlled by separate timers/programmers connected appropriately to energise the the room thermostat 96 (which when energised provides an input to terminal 114) and water thermostat 92 (which when energised provides an input to terminal 124).

A modification to the system controller 70 is illustrated in FIG. 3A which shows only that part of the circuit of the modified system controller which has been altered—all other parts being the same.

In this modified arrangement the input 182 to comparator 176 is, as before, derived from the currents passed by transducers 132 and 162. Thus the boiler will be de-energised as soon as the temperature in flow pipe 76 reaches that which has been predetermined by setting variable resistor 180 (taking into account any variation provided by the action of transducer 162).

The modified system controller is, however, provided with a third IC temperature transducer 200 similar to the transducers 132 and 162 already described and connected between the reference voltage line 136 and line 28 in series with a resistor 202 itself shunted by a capacitor 204 as shown. The third IC temperature transducer 200 is mounted in a position in the central heating system to monitor the temperature of the return flow of water to the boiler at 84. The voltage at the junction of the third IC temperature transducer 200 and resistor 202 is proportional to the current passed by the transducer 200 and therefore of the monitored temperature of the return water flow to the boiler. This voltage is—as shown in FIG. 3A—used as an input to comparator 42' in place of the voltage arising at the junction of transducer 132 and resistor 135.

In this modified form of the system controller the boiler is re-energised in response therefore to the temperature of the water being returned to the boiler from the central heating system and not in response to the temperature of the water flowing from the boiler.

It will be appreciated that if desired additional IC temperature transducers may be incorporated in the system controller for providing separate indications of the temperature of the directly heated water being fed to the radiators and the cylinder—such an arrangement preferably including further switches operable selectively to enable control of the boiler in response to output of the appropriate sensor when the system is called upon to provide room heating alone or to heat the water in said cylinder.

The system controller 70 described with reference to FIGS. 3 and 3A has been described as controlling a central heating system in which there are provided two pumps 78 and 88 separately pumping the heated water from the boiler to the heat exchanger 85 in cylinder 86 and to the radiators 80, respectively.

The system controller 70 may be used to control central heating systems having a single pump for pumping heated water to both a heat exchanger in a hot water cylinder and radiators in the central heating systems (so called in the UK Pumped Primary systems). If used for control of this type central heating system the switch 170 is closed and the terminals 118 and 120 of the system controller are electrically connected by a link (shown dotted in FIG. 3) connection to the single pump being from terminal 118 or 120.

The system controller 70 may also be used to control central heating systems having a single pump for pumping heated water to radiators in the central heating systems and relying upon gravity/convection water flow to pass water from the boiler to a heat exchanger in a hot water cylinder (so called in the UK Gravity fed systems). If used for control of this type central heating system the switch 170 is opened and terminal 118 connected to the single pump in the system.

It will be appreciated from the above description that the system controller 70 provides a centralised unit to which other elements of the system may readily be connected by one without electrical skill and furthermore provides a form of control enabling the operation central heating system in either or both of hot water and room heating modes.

It will be appreciated that in the arrangements of FIGS. 3 and 3A, the operation of the boiler is controlled by the outputs of the silicon controlled recitifer 36 and the transistor 184 which provide a form of output control which is switched between two stable states (boiler de-energised and boiler re-energised) in response to the outputs of the comparators 42' and 176. It will be appreciated by those skilled in the art that this form of control may be provided, if desired, by any suitable switching bistable apparatus including, for example, known forms of flip-flop, (including Integrated Circuit devices). It will further be appreciated by those skilled in the art that the relay switching 34 provided in the arrangements described may be replaced by any other suitable device capable of safely switching the power drawn by the boiler fuel flow control valve, for example triac switching devices (perhaps controlled opto-electronically).

It will further be seen both forms of system controller now disclosed allow closer and more effective control of boilers in central heating systems on an individual, system-by-system basis, in particular by allowing the boiler control circuitry to operate as normal when firing from cold to raise the temperature of the system to a high level but thereafter preventing the boiler firing again until the temperature of the water in the system has fallen to a level at which heat input to that water system can usefully be accepted by the system and output by the radiators and/or heat exchangers in the system.

I claim:

1. Apparatus for controlling operation of a heating system, which system includes a boiler directly heating and passing water to a pipe network of the system and comprising means for sensing the temperature of water in said pipe network at one or more positions remote from the boiler and switch means responsive to the output of said temperature sensing means, which switch means is operable to permit energisation of the boiler until the output of the temperature sensing means indicates that a temperature being monitored has reached a first temperature level and thereafter prevent energisation of the boiler until the output of said temperature sensing means indicates that the said temperature being monitored has fallen below a second temperature level less than the first temperature level, wherein said temperature sensing means is arranged to generate a first voltage output whenever said monitored temperature reaches or exceeds said first temperature level and a second voltage output whilst the first said monitored temperature is less than said second temperature level, wherein means are provided enabling said first and second voltage outputs to be varied in equal amounts in dependence upon the ambient temperature of an area remote from the area being heated by the central heating system, wherein said switch means includes semiconductor switch means controlling operation of a further switch which, when closed, connects a fuel control valve for the boiler to a power supply therefor and which, when open, disconnects said power supply and said fuel control valve, the apparatus further including a light emitting diode arranged in the semiconductor switch means to be illuminated when that switch means is operable to disable operation of the boiler so as to provide an indication thereof.

2. Apparatus as claimed in claim 1, wherein said further switch comprises a normally open relay having a coil which is connected in the circuit of said semiconductor switch means and which when energised to close is operable to connect said fuel control valve to said power supply therefore.

3. Apparatus as claimed in claim 2, wherein the semiconductor switch means includes a silicon controlled rectifier operation of which is controlled by a first control device in response to said first and second voltage outputs of said temperature sensing means and a reference voltage, said silicon controlled rectifier being switched non-conductive and causing said further switch to open when said first temperature level is indicated by the temperature sensing means and thereafter be latched conductive and cause the further switch to close when the said second temperature level is indicated by the temperature sensing means.

4. Apparatus as claimed in claim 2, wherein said semiconductor switch means comprises a bistable latching circuit which is switched to a first state opening said further switch by a first control device operating in response to said first output voltage from said temperature sensing means and which is switched to a second state closing said further switch by a second control device operating in response to said second output voltage of said temperature sensing means.

5. Apparatus as claimed in claim 4, said bistable device comprises a silicon controlled rectifier and a transistor the emitter-collector path of which transistor is connected in series both with the silicon controlled rectifier and the coil of said relay, the silicon controlled rectifier and transistor both being biased conductive in response to said second output voltage of said temperature sensing means and said transistor being biased non-conductive in response to said first output voltage of said temperature sensing means.

6. Apparatus as claimed in claim 3, wherein said temperature sensing means comprises one or more thermistor devices.

7. Apparatus as claimed in claim 4, wherein said temperature sensing means includes a temperature transducer operable to pass a current proportional to the temperature thereof and connected in series with resistor.

8. Apparatus as claimed in claim 7, wherein said temperature sensing means includes a second temperature transducer operable to pass a current which is proportional to the temperature thereof, and which is connectable in parallel with said first mentioned temperature transducer and is mountable such that the current passed thereby is proportional to ambient temperature outside a building heated by the central heating system.

9. Apparatus as claimed in claim 6, wherein said first or said first and second control devices are operational amplifiers.

10. Apparatus as claimed in claim 7, wherein said first or said first and second control devices are comparators.

11. Apparatus as claimed in claim 1, in which the boiler operates under the control of a thermostatic controller therein, the apparatus further including means for setting said first and second voltage outputs at levels equivalent to sensed temperatures less than the temperatures at which the thermostatic controller in the boiler acts to de-energise and re-energise, respectively, the boiler.

12. Apparatus as claimed in claim 6, wherein the temperature sensing means includes a single temperature sensor mounted to sense the temperature of water in the pipe network at a position remote from the boiler, and to provide said first output voltage when the sensed temperature thereat reaches or exceeds a first predetermined temperature and to provide said second output voltage when the sensed temperature thereat reaches or falls below a second predetermined temperature.

13. Apparatus as claimed in claim 4, wherein the temperature sensing means includes a first temperature sensor mounted to sense the temperature of water in the pipe network at a first position remote from the boiler and to provide said first output voltage when the sensed temperature at said first position reaches or exceeds a first predetermined temperature, and a second temperature sensor mounted to sense the temperature of water in the pipe network at a second position remote from the boiler and said first position and to provide said second output voltage whilst the sensed temperature at said second position is less than or equal to a second predetermined temperature.

14. Apparatus as claimed in claim 13, wherein said first temperature sensor mounted to sense the temperature of water in the pipe network flowing from the boiler and the second temperature sensor is mounted to sense the temperature of water in the pipe network flowing to the boiler.

15. Apparatus as claimed in claim 8, for controlling operation of a central heating system supplying heated water to both room heating radiators and a heat exchanger in a hot water cylinder included in the system, and including switch means operable selectively to connect either said second integrated circuit temperature transducer or a reference resistance in parallel with the said first integrated circuit temperature transducer when the system is called upon to provide room heating alone or to heat the water in said cylinder.

16. Apparatus as claimed in claim 8, for controlling operation of a central heating system supplying heated water to both room heating radiators and a heat exchanger in a hot water cylinder included in the system, and wherein there is provided temperature sensing means operable to sense the temperature of the pipe network at positions remote from the boiler indicative of the temperature of water being fed to respectively first the said radiators and second the said heat exchanger, and including further switch means operable selectively to enable control of the boiler in response to the outputs of either said first or said second temperature sensing means when the system is called upon to provide room heating alone or to heat the water in said cylinder.

* * * * *